US012666393B2

(12) United States Patent　(10) Patent No.:　US 12,666,393 B2
Liu　(45) Date of Patent:　Jun. 23, 2026

(54) INFORMATION TRANSMISSION METHOD AND APPARATUS, AND COMMUNICATION DEVICE AND STORAGE MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 336 days.

(21) Appl. No.: 18/278,834

(22) PCT Filed: Feb. 26, 2021

(86) PCT No.: PCT/CN2021/078153
§ 371 (c)(1),
(2) Date: Aug. 24, 2023

(87) PCT Pub. No.: WO2022/178832
PCT Pub. Date: Sep. 1, 2022

(65) Prior Publication Data
US 2024/0137909 A1　Apr. 25, 2024
US 2024/0236940 A9　Jul. 11, 2024

(51) Int. Cl.
*H04W 68/02*　(2009.01)
*H04B 7/06*　(2006.01)
*H04L 5/00*　(2006.01)
*H04W 72/232*　(2023.01)

(52) U.S. Cl.
CPC .......... *H04W 68/02* (2013.01); *H04B 7/0626* (2013.01); *H04L 5/0051* (2013.01); *H04W 72/232* (2023.01)

(58) Field of Classification Search
CPC .. H04W 68/02; H04W 72/232; H04B 7/0626; H04L 5/0051; H04L 5/0048
See application file for complete search history.

(56) References Cited

U.S. PATENT DOCUMENTS

| 10,531,326 | B2 | 1/2020 | Hong et al. | |
| 12,096,488 | B2 * | 9/2024 | Xu | H04W 52/028 |
| 12,219,523 | B2 * | 2/2025 | Takeda | H04W 72/0446 |
| 2019/0037425 | A1 | 1/2019 | Hong et al. | |
| 2019/0273637 | A1 | 9/2019 | Zhang et al. | |
| 2024/0049176 | A1 * | 2/2024 | Xu | H04W 72/23 |

FOREIGN PATENT DOCUMENTS

| CN | 109309969 A | 2/2019 |
| CN | 112136349 A | 12/2020 |

OTHER PUBLICATIONS

International Search Report of PCT/CN2021/078153 dated Jun. 30, 2021 with English translation, (4p).

(Continued)

*Primary Examiner* — Chandrahas B Patel
(74) *Attorney, Agent, or Firm* — Arch & Lake LLP

(57) ABSTRACT

The embodiments of the present disclosure relate to an information transmission method and apparatus, and a communication device and a storage medium. The method comprises: a base station sending first paging early indication (PEI) configuration information, wherein the first PEI configuration information is used for indicating whether a reference signal is used for indicating a PEI.

20 Claims, 4 Drawing Sheets

(56) References Cited

OTHER PUBLICATIONS

CATT, "Paging enhancement for UE power saving", 3GPP TSG RAN WG1 #104-e, R1-2100392, e-Meeting, Jan. 25-Feb. 5, 2021, (17p).

Moderator (MediaTek), "Summary for Paging Enhancements", 3GPP TSG RAN WG1 e-Meeting #104, R1-2101948, e-Meeting, Jan. 25-Feb. 5, 2021 Agenda Item: 8.7.1.1, (36p).

CATT, "Details of PEI configuration", 3GPP TSG RAN WG1 #104-e, R1-2100394, e-Meeting, Jan. 25-Feb. 5, 2021, (14p).

The First CNOA issued in Application No. 202180000591.0 dated Jun. 1, 2022, with English translation, (12p).

* cited by examiner

INFORMATION TRANSMISSION METHOD AND APPARATUS, AND COMMUNICATION DEVICE AND STORAGE MEDIUM

CROSS-REFERENCE OF RELATED APPLICATION

The present application is a National Stage of International Application No. PCT/CN2021/078153, filed on Feb. 26, 2021, the contents of all of which are incorporated by reference herein in their entireties for all purposes.

BACKGROUND

In the standardization of the 3GPP (The Third Generation Partnership Project) for power saving projects in version 17 (R17, Release 17), it is proposed to use an additional Tracking Reference Signal (TRS)/Channel State Information Reference Signal (CSI-RS) in idle or inactive states to assist user equipment (UE) in acquiring and network time-frequency domain synchronization.

SUMMARY

The present disclosure relates to the field of wireless communication technology, but is not limited to it, in particular to information transmission method, apparatus, communication device, and storage medium.

According to a first aspect of the embodiments of the present disclosure, an information transmission method is provided. The method is applied to a base station, and includes: sending first paging early indication (PEI) configuration information, wherein the first PEI configuration information indicates whether a reference signal is used to indicate PEI.

According to a second aspect of the embodiments of the present disclosure, an information transmission method is provided. The method is applied to user equipment (UE) and includes: receiving first paging early indication PEI configuration information; determining whether a reference signal is used to indicate PEI based on the first PEI configuration information.

According to a third aspect of the embodiments of the present disclosure, a communication device is provided, including a processor, a memory, and an executable program stored on the memory and capable of being run by the processor. The processor executes steps of the information transmission method according to the first aspect or the second aspect when running the executable program.

According to a fourth aspect of the embodiments of the present disclosure, a storage medium is provided, where the executable program is executed by a processor to implement steps of the information transmission method according to the first aspect or the second aspect.

It should be understood that the general description above and the detailed description in the following text are only illustrative and explanatory, and do not limit the disclosed embodiments.

BRIEF DESCRIPTION OF THE DRAWINGS

The accompanying drawings here are incorporated into the specification and form a part of this specification, showing compliance with the embodiments of the present disclosure and used together with the specification to explain the principles of the embodiments of the present disclosure.

DETAILED DESCRIPTION

Here, a detailed explanation will be given of exemplary embodiments, which are illustrated in the accompanying drawings. When the following description refers to the accompanying drawings, unless otherwise indicated, the same numbers in different drawings represent the same or similar elements. The embodiments described in the following exemplary embodiments do not represent all embodiments that are consistent with the embodiments of the present disclosure. On the contrary, they are only examples of devices and methods that are consistent with some aspects of the embodiments of the present disclosure as detailed in the attached claims.

The terms used in embodiments of the present disclosure are solely for the purpose of describing specific embodiments, and are not intended to limit embodiments of the present disclosure. The singular forms of "one", "said", and "the" used in embodiments of the present disclosure and the accompanying claims are also intended to include the majority form, unless the context clearly indicates other meanings. It should also be understood that the term "and/or" used herein refers to and includes any or all possible combinations of one or more related listed items.

It should be understood that although the terms first, second, third, etc. may be used to describe various information in embodiments of the present disclosure, such information should not be limited to these terms. These terms are only used to distinguish information of same type from each other. For example, without departing from the scope of embodiments of the present disclosure, the first information can also be referred to as the second information, and similarly, the second information can also be referred to as the first information. Depending on the context, the word "if" used here can be interpreted as "at the time of" or "when" or "in response to determining".

Figure 1:
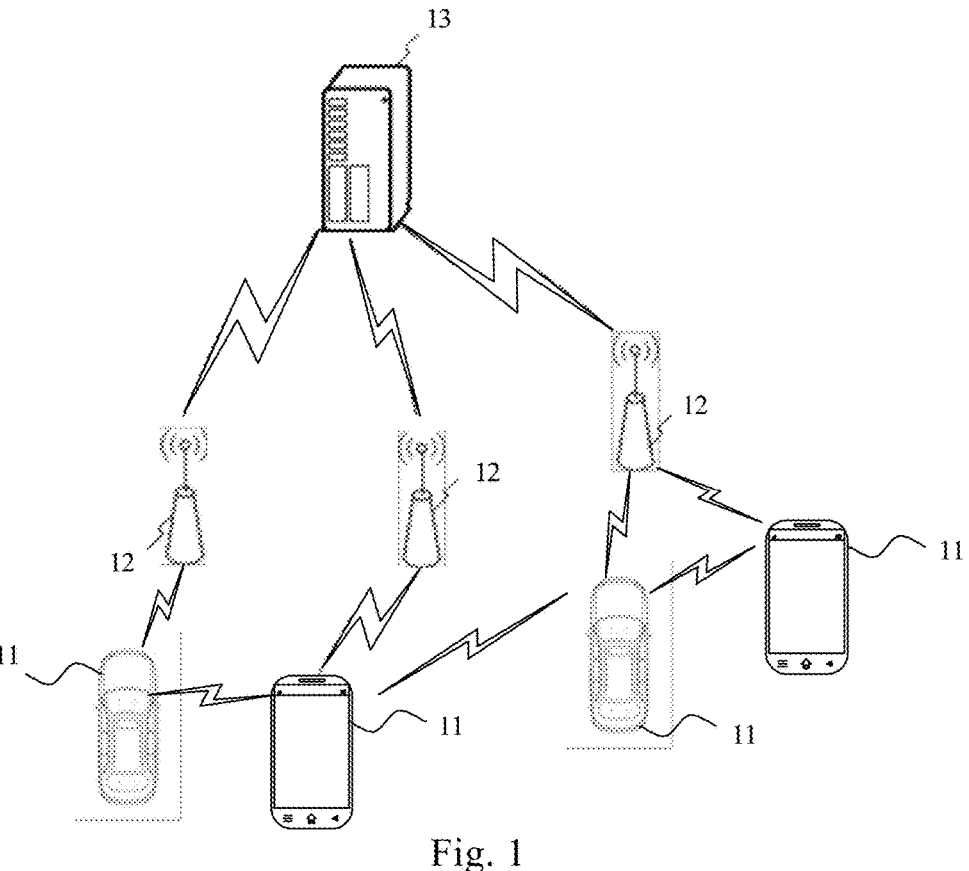
FIG. 1 is a schematic diagram of the structure of a wireless communication system according to an exemplary embodiment of the present disclosure.

Please refer to FIG. 1, which shows a schematic diagram of the structure of a wireless communication system provided by an embodiment of the present disclosure. As shown in FIG. 1, the wireless communication system is a communication system based on cellular mobile communication technology, which can include several terminals 11 and several base stations 12.

The terminal 11 can be a device that provides voice and/or data connectivity to users. The terminal 11 can communicate with one or more core networks through a Radio Access Network (RAN). The terminal 11 can be an IoT terminal, such as sensor devices, mobile phones (or "cellular"

phones), and computers with IoT terminals, such as fixed, portable, pocket, handheld, computer built-in, or vehicle mounted devices. For example, the terminal 11 may be a station (STA), a subscriber unit, a subscriber station, a mobile station, a mobile, a remote station, an access point, a remote terminal, an access terminal, a user terminal, a user agent, a user device or user equipment (UE). Alternatively, the terminal 11 can also be a device for unmanned aerial vehicles. Alternatively, the terminal 11 can also be an onboard device, such as an electronic control unit with wireless communication function or a wireless communication device connected to an external electronic control unit. Alternatively, the terminal 11 can also be a roadside device, such as a street light, signal light, or other roadside device with wireless communication function.

The base station 12 can be a network side device in a wireless communication system. The wireless communication system can be the 4th generation mobile communication (4G) system, also known as Long Term Evolution (LTE) system. Alternatively, the wireless communication system can also be a 5G system, also known as a new radio (NR) system or a 5G NR system. Alternatively, the wireless communication system can also be the next generation system of the 5G system. The access network in the 5G system can be called NG-RAN (New Generation-Radio Access Network). Alternatively, the wireless communication system can be MTC system.

The base station 12 can be an evolutionary base station (eNB) used in a 4G system. Alternatively, the base station 12 can also be a base station (gNB) of centralized distributed architecture in a 5G system. When the base station 12 adopts a centralized distributed architecture, it usually includes a central unit (CU) and at least two distributed units (DU). The centralized unit is provided with a protocol stack of Packet Data Convergence Protocol (PDCP) layer, Radio Link Control (RLC) layer, and Media Access Control (MAC) layer; the distributed unit is provided with a protocol stack of the physical (PHY) layer, and the specific implementation method of base station 12 is not limited in embodiments of the present disclosure.

A wireless connection can be established between the base station 12 and the terminal 11 through a wireless air interface. In a different embodiment, the wireless air interface is based on the 4th generation mobile communication network technology (4G) standard. Alternatively, the wireless air interface is a wireless air interface based on the 5th generation mobile communication network technology (5G) standard, such as a new radio. Alternatively, the wireless air interface can also be a wireless air interface based on the next generation mobile communication network technology standard of 5G.

In some embodiments, an E2E (End to End) connection can also be established between terminals 11. For example, it may be applied in scenarios such as V2V (vehicle to vehicle) communication, V2I (vehicle to infrastructure) communication, and V2P (vehicle to pedestrian) communication in Vehicle to Everything (V2X) communication.

In some embodiments, the wireless communication system mentioned above may also include a network management device 13.

Several base stations 12 are respectively connected to network management device 13. The network management device 13 can be a core network device in the wireless communication system. For example, the network management device 13 can be a Mobility Management Entity (MME) in the Evolved Packet Core (EPC). Alternatively, the network management device can also be another core network device, such as Service GateWay (SGW), Public Data Network GateWay (PGW), Policy and Charging Rules Function (PCRF), or Home Subscriber Server (HSS). The implementation form of the network management device 13 is not limited by embodiments of the present disclosure.

The executing entities involved in embodiments of the present disclosure include but are not limited to UE such as mobile terminal that supports cellular mobile communication, as well as base station.

One application scenario of embodiments of the present disclosure is that the paging early indication (PEI) can be used to indicate whether there is a UE paging message at the PO after the PEI. If there is no UE paging message at the PO, the UE can be kept in a sleep state at the PO position, thereby saving power. How to indicate PEI to UE is an urgent issue that needs to be addressed.

Figure 2:
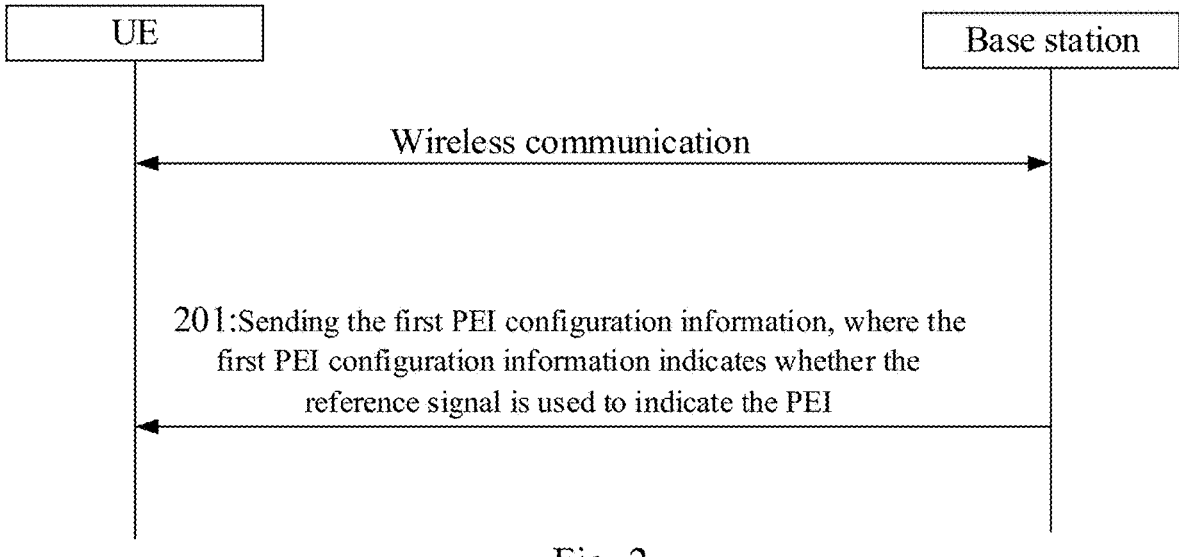
FIG. 2 is a flowchart illustrating an information transmission method according to an exemplary embodiment of the present disclosure.

As shown in FIG. 2, this exemplary embodiment provides an information transmission method that can be applied to a base station of a cellular mobile communication system, including:

Step 201: Sending the first PEI configuration information, where the first PEI configuration information indicates whether the reference signal is used to indicate the PEI.

Here, UE can be a mobile terminal that uses cellular mobile communication technology for wireless communication. The base station can be a communication device that provides access network interfaces to UE in a cellular mobile communication system. UE can be in an idle or inactive state.

The reference signal can be a signal used for UE downlink synchronization.

In one embodiment, the reference signal includes: TRS and/or CSI-RS.

Here, TRS and/or CSI-RS can be shared by idle state UE and/or inactive state UE and/or connected state UE. Idle state UE and/or inactive state UE can monitor TRS and/or CSI-RS with connected state UE at TRS and/or CSI-RS occasion.

For example, idle state UE and/or inactive state UE can perform downlink synchronization based on the monitored TRS and/or CSI-RS.

The first PEI configuration information can indicate the configuration of the PEI, such as the transmission resources of PEI, the signaling that carries PEI, etc.

After receiving the signal configuration information, UE can obtain the first PEI configuration information from the signal configuration information and determine the configuration of the PE, and then receive PEI based on the configuration of the PEI.

PEI can be carried by reference signals such as TRS and/or CSI-RS. PEI can indicate two states at the PO: with paging message and without paging message. The two states of PEI can be indicated by different codes and transmission resources of the reference signals.

The first PEI configuration information can indicate whether the reference signal is used to indicate PEI, i.e., whether the reference signal is used to indicate the two states indicated by the PEI.

Thus, by explicitly indicating whether the UE determines the PEI based on the reference signal through the first PEI configuration information, the efficiency of determining PEI by the UE is improved.

In one embodiment, sending the first PEI configuration information includes:

Sending signal configuration information carrying the first PEI configuration information, where the signal configuration information is at least used to indicate the transmission resources of the reference signal.

The signal configuration information can indicate the configuration of the reference signal, such as the transmission resource configuration of reference signals.

The transmission resources of TRS and/or CSI-RS configured by the signal configuration information include but are not limited to frequency domain resource, time domain resource, and/or code domain resource.

The base station usually configures the signal configuration information of a set of TRS and/or CSI-RS for a connected state UE. The base station can send signal configuration information to the connected state UE through dedicated signaling. The base station can also broadcast signal configuration information to the idle state UE and/or the inactive state UE through system information, etc.

In this way, the idle state UE and/or the inactive state UE can determine the configuration of PEI from the signal configuration information of the reference signal, thereby achieving the reception of PEI, and meanwhile increasing the amount of information carried by signal configuration information.

In one embodiment, the first PEI configuration information indicates at least one of the following:

When the signal configuration information is active, the reference signal associated with the signal configuration information is used to indicate the PEI;

When the signal configuration information is inactive, the reference signal associated with the signal configuration information is not used to indicate the PEI.

The base station can make active settings based on signal configuration information. The base station can indicate to the UE whether the signal configuration information is active through the active indication. The signal configuration information is in an active state, indicating that the transmission resource configured by the signal configuration information reasonably exists, and the base station actually sends reference signal such as TRS and/or CSI-RS corresponding to the transmission resource. At this time, it is available to the UE, and the network side expects the UE to use it. The signal configuration information is in an inactive state, indicating that the transmission resource configured by the signal configuration information may unreasonably exist, or that the transmission resource configured by the signal configuration information may reasonably exist, but this transmission resource is not used to send TRS and/or CSI-RS at the network side. For UE, if the signal configuration information is in an inactive state, it means that the reference signal sent by the transmission resource is not available, and the network side does not expect UE to use it.

When the signal configuration information is active, the base station sends reference signal based on the transmission resource of the signal configuration information or the like. When the signal configuration information is inactive, the base station will not send reference signal based on the transmission resource of the signal configuration information or the like.

The first PEI configuration information can indicate that the reference signal is used to indicate the PEI when the signal configuration information is active. That is to say, the reference signal is used to indicate PEI only when the base station actually sends the reference signal.

The first PEI configuration information can indicate that the reference signal is not used to indicate the PEI when the signal configuration information is inactive.

UE can determine the PEI based on the reference signal when the signal configuration information is active, as indicated by the first PEI configuration information. When the signal configuration information is inactive, PEI is not determined based on the reference signal.

In this way, by explicitly indicating the occasion of UE determining PEI based on the reference signal through the first PEI configuration information, the efficiency of determining PEI by UE is improved.

In one embodiment, in response to that the reference signal associated with the signal configuration information is used to indicate the PEI, the method further includes at least one of the following:

sending the reference signal through a first physical resource, where the reference signal sent through the first physical resource is used to indicate a first state of the PEI, where the first state of the PEI is used to indicate the UE to receive paging related information at a predetermined paging occasion PO;

sending the reference signal through a second physical resource, where the reference signal sent through the second physical resource is used to indicate a second state of the PEI, where the second state of the PEI is used to indicate the UE not to receive paging related information at the predetermined PO, where the first physical resource is different from the second physical resource.

The base station can be configured with two reference signals transmitted using different physical resources. The reference signals transmitted through different physical resources indicate different states of PEI.

Here, different physical resources can include but are not limited to different time domain and/or frequency domain resources.

The paging related information includes but is not limited to: Downlink Control Information (DCI) for scheduling transmission resource of paging message, and/or paging message, or the like.

PEI can indicate whether UE wakes up at one or more POs. For example, it can indicate that the UE wakes up at one or more predetermined POs. The predetermined POs can include but are not limited to one or more POs after the PEI time domain position. For example, the predetermined PO can be the first PO after the PEI time domain position. The predetermined PO can be specified by the communication protocol or agreed upon between the base station and the UE.

The first state of PEI, which can be a true state, is used to indicate the UE to receive paging related information at a predetermined PO. The first state of PEI, which can be a false state, is used to indicate the UE not to receive paging related information at the predetermined PO; UE can be kept in a sleep state at PO.

If the encoding form of the reference signal or information contained in the reference signal is fixed, then the reference signal cannot use numerical information to represent the different states of different PEIs. Here, the different states of PEI can be indicated by physical resources carrying reference signals. For example, using a first physical resource to transmit a reference signal can indicate that the PEI is in the first state. Using a second physical resource to transmit a reference signal can indicate that the PEI is in the second state. The first physical resource is different from the second physical resource.

When the base station uses the first physical resource to transmit the reference signal, and the UE receives the reference signal through the first physical resource, the UE can receive the paging related information at the predetermined PO. When the base station uses a second physical resource to transmit the reference signal, and the UE receives the reference signal through the second physical resource, the UE can be kept in a sleep state at the predetermined PO.

In this way, different states of the PEI are indicated by different transmission physical resources of the reference signals, and the coding of the reference signal does not need to be changed, so as to improve the compatibility of the reference signal.

In one embodiment, the method further includes:

Sending the reference signals through different physical resources for UE belonging to different predetermined groups.

For situations where there are a large number of idle state and/or inactive state UE, the base station can divide the UE into N groups, where N is a positive integer greater than or equal to 2. A group can include one or more UE. The base station can configure different physical resources of reference information for each group of UE. A group of UE can be allocated two physical resources of reference information, which are used to indicate different states of PEI respectively. The base station configures 2N physical resources of reference information for N groups of UE, and each group of UE is configured with two physical resources of reference information.

For example, the base station can divide UE into two groups, and the physical resources of the reference signals configured for the first and second groups of UE by the base station are different. UE can receive reference signal from corresponding physical resource based on its group, and determine the state of PEI based on the reference signal received through different physical resource.

For example, the physical resources of the reference signal configured by the base station for the first group of UE are a first physical resource and a second physical resource. The reference signal transmitted through the first physical resource can indicate that the PEI is in the first state. The reference signal transmitted through the second physical resource can indicate that the PEI is in the second state. The first group of UE receives reference signals at the first and/or second physical resources, and determines the states of the PEI based on the reference signals received by the first and/or second physical resources.

The physical resources of the reference signal configured by the base station for the second group of UE are a third physical resource and a fourth physical resource. The reference signal transmitted by the third physical resource can indicate that the PEI is in the first state. The reference signal transmitted by the fourth physical resource can indicate that the PEI is in the second state. The second group of UE receives reference signals at the third and/or fourth physical resources, and determines the states of the PEI based on the reference signals received by the third and/or fourth physical resources. In this way, PEI can be indicated for different groups of UE through reference signals from different resources, thereby reducing the occurrence of false wake-up when all UEs use the same PEI. In one embodiment, the method further includes:

In response to the base station configured with first PEI configuration information and second PEI configuration information, where the first PEI configuration information indicates that the reference signal is used to indicate the PEI, and the second PEI configuration information indicates that predetermined information is used to indicate the PEI, where the predetermined information is different from the reference signal;

Configuring the priorities corresponding to the first PEI configuration information and the second PEI configuration information, where the priorities corresponding to the first PEI configuration information and the second PEI configuration information are used by UE to determine the PEI based on the first PEI configuration information or the second PEI configuration information.

The base station configures different signals to indicate PEI, such as using the reference signal to indicate PEI, or using another signal different from the reference signal to indicate PEI. For the case of using different signals to indicate PEI, the base station can configure different PEI configuration information for different signals: configure first PEI configuration information for the case of using reference signal to indicate PEI, and configure second PEI configuration information for the case of using other signal different from the reference signal to indicate PEI. Here, the first PEI configuration information and the second PEI configuration information are only for example, and the base station can configure more than two pieces of PEI configuration information.

The base station can set priorities for both the first PEI configuration information and the second PEI configuration information. When the base station is configured with both the first configuration information and second PEI configuration information, UE can determine the PEI based on the first configuration information and second PEI configuration information according to the priorities. That is to say, UE can determine whether to determine the PEI based on the reference signal or based on predetermined information different from the reference signal according to the priorities. For example, if the priority of the first PEI configuration information is higher than that of the second PEI configuration information, the PEI is determined based on the reference signal; if the priority of the second PEI configuration information is higher than that of the first PEI configuration information, the PEI is determined based on the predetermined information. Here, the predetermined information can be another signal different from the reference signal, or it can be downlink signaling, etc. In one embodiment, the second PEI configuration information indicates using a DCI message to indicate the PEI.

Here, the base station can use reference signals such as TRS and/or CSI-RS to indicate PEI. DCI message can also be used to indicate PEI. Two different codes of one or more bits in DCI can be used to indicate the two states of PEI.

Figure 3:
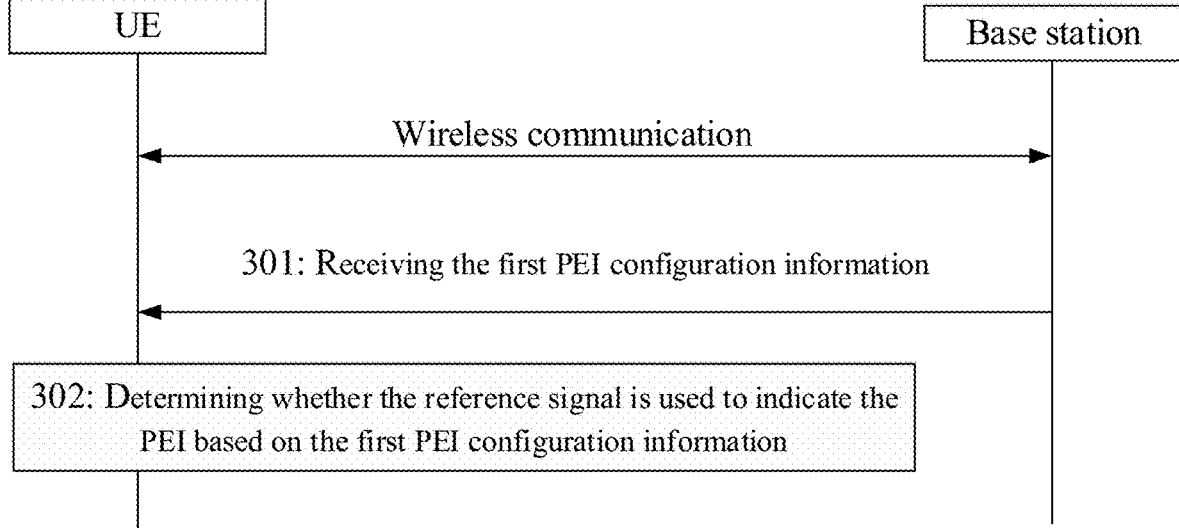
FIG. 3 is a flowchart illustrating another information transmission method according to an exemplary embodiment of the present disclosure.

As shown in FIG. 3, the exemplary embodiment provides an information transmission method that can be applied to UE in cellular mobile communication system, including:

Step 301: receiving the first PEI configuration information;

Step 302: determining whether the reference signal is used to indicate the PEI based on the first PEI configuration information.

Here, UE can be a mobile terminal that uses cellular mobile communication technology for wireless communication, etc. The base station can be a communication device that provides an access network interface to UE in a cellular mobile communication system. UE can be in an idle state or inactive state.

The reference signal can be a signal for UE downlink synchronization.

In one embodiment, the reference signal includes: TRS and/or CSI-RS.

Here, TRS and/or CSI-RS can be shared by idle state UE and/or inactive state UE and/or connected state UE. Idle state UE and/or inactive state UE can monitor TRS and/or CSI-RS with connected state UE at TRS and/or CSI-RS occasions.

For example, idle state UE and/or inactive state UE can perform downlink synchronization based on the monitored TRS and/or CSI-RS.

The first PEI configuration information can be used to indicate the configuration of the PEI, such as the transmission resource of PEI, the signaling that carries PEI, etc. After receiving the signal configuration information, UE can obtain the first PEI configuration information from the signal configuration information and determine the configuration of the PEI, and then receive PEI based on the configuration of the PEI.

PEI can be carried by reference signals such as TRS and/or CSI-RS. PEI can indicate two states at the PO: with paging message and without paging message. The two states of PEI can be indicated by different codes and transmission resources of reference signals.

The first PEI configuration information can indicate whether the reference signal is used to indicate PEI, i.e., whether the reference signal is used to indicate the two states indicated by the PEI.

Thus, by explicitly indicating whether the UE determines the PEI based on the reference signal through the first PEI configuration information, the efficiency of determining the PEI by the UE is improved.

In one embodiment, receiving first PEI configuration information includes:

Receiving signal configuration information carrying the first PEI configuration information, where the signal configuration information is at least used to indicate the transmission resource of the reference signal.

The signal configuration information can be used to indicate the configuration of reference signal, such as the transmission resource configuration of reference signal.

The transmission resource of TRS and/or CSI-RS configured by signal configuration information includes but not limited to frequency domain resource, time domain resource, and/or code domain resource, etc.

The base station usually configures the signal configuration information of a set of TRS and/or CSI-RS for a connected state UE. The base station can send signal configuration information to the connected state UE through dedicated signaling. The base station can also broadcast signal configuration information to the idle state UE and/or the inactive state UE through system information, etc.

In this way, the idle state UE and/or the inactive state UE can determine the configuration of PEI from the signal configuration information of the reference signal, thereby achieving the reception of PEI, and meanwhile increasing the amount of information carried by signal configuration information.

In one embodiment, determining whether the reference signal is used to indicate the PEI based on the first PEI configuration information, including at least one of the following:

Based on the PEI configuration information, it is determined that when the signal configuration information is active, the reference signal associated with the signal configuration information is used to indicate the PEI;

Based on the PEI configuration information, it is determined that when the signal configuration information is inactive, the reference signal associated with the signal configuration information is not used to indicate the PEI.

The base station can make active settings based on signal configuration information. The base station can indicate to the UE whether the signal configuration information is active through the active indication. The signal configuration information is in an active state, indicating that the transmission resource configured by the signal configuration information reasonably exists, and the base station actually sends reference signal such as TRS and/or CSI-RS corresponding to the transmission resource. At this time, it is available to the UE, and the network side expects the UE to use it. The signal configuration information is in an inactive state, indicating that the transmission resource configured by the signal configuration information may unreasonable exist, or that the transmission resource configured by the signal configuration information may reasonably exist, but this transmission resource is not used to send TRS and/or CSI-RS at the network side. For UE, if the signal configuration information is in an inactive state, it means that the reference signal sent by the transmission resource is not available, and the network side does not expect UE to use it.

When the signal configuration information is active, the base station sends reference signal based on the transmission resource of the signal configuration information or the like. When the signal configuration information is inactive, the base station will not send reference signal based on the transmission resource of the signal configuration information or the like.

The first PEI configuration information can indicate that the reference signal is used to indicate the PEI when the signal configuration information is active. That is to say, the reference signal is used to indicate PEI only when the base station actually sends the reference signal.

The first PEI configuration information can indicate that the reference signal is not used to indicate the PEI when the signal configuration information is inactive.

UE can determine the PEI based on the reference signal when the signal configuration information is active, as indicated by the first PEI configuration information. When the signal configuration information is inactive, PEI is not determined based on the reference signal.

In this way, by explicitly indicating the occasion of UE determining PEI based on the reference signal through the first PEI configuration information, the efficiency of determining PEI by UE is improved.

In one embodiment, in response to determining that the reference signal associated with the signal configuration information is used to indicate the PEI, the method further includes at least one of the following:

In response to receiving the reference signal through a first physical resource, determining that the PEI is in a first state, where the first state of the PEI is used to indicate the UE to receive paging related information at a predetermined paging occasion PO;

In response to sending the reference signal through a second physical resource, determining that the PEI is in a second state, where the second state of the PEI is used to indicate the UE not to receive paging related information at the predetermined paging time PO, where the first physical resource is different from the second physical resource.

The base station can be configured with two reference signals sent through different physical resources. The reference signals sent through different physical resources indicate different states of PEI.

Here, different physical resources can include but are not limited to different time domain and/or frequency domain resources.

The paging related information includes but is not limited to: DCI for scheduling transmission resource of paging message, and/or paging message, or the like.

PEI can indicate whether the UE wakes up at one or more POs. For example, it can indicate that the UE wakes up at one or more predetermined POs. The predetermined POs can include but are not limited to one or more POs after the PEI time domain position. For example, the predetermined PO can be the first PO after the PEI time domain position. The predetermined PO can be specified by the communication protocol or agreed upon between the base station and the UE.

The first state of PEI, which can be a true state, is used to indicate the UE to receive paging related information at a predetermined PO. The first state of PEI, which can be a false state, is used to indicate the UE not to receive paging related information at the predetermined PO; UE can be kept in a sleep state at PO.

If the encoding form of the reference signal or information contained in the reference signal is fixed, then the reference signal cannot use numerical information to represent the different states of different PEIs. Here, the different states of PEI can be indicated by physical resources carrying reference signals. For example, using a first physical resource to transmit a reference signal can indicate that the PEI is in the first state. Using a second physical resource to transmit a reference signal can indicate that the PEI is in the second state. The first physical resource is different from the second physical resource.

When the base station uses the first physical resource to transmit the reference signal, and the UE receives the reference signal through the first physical resource, the UE can receive the paging related information at the predetermined PO. When the base station uses a second physical resource to transmit the reference signal, and the UE receives the reference signal through the second physical resource, the UE can be kept in a sleep state at the predetermined PO.

In this way, different states of the PEI are indicated by different transmission physical resources of the reference signal, and the coding of the reference signal does not need to be changed, so as to improve the compatibility of the reference signal.

In one embodiment, the method further includes:

Receiving the reference signal through the physical resource corresponding to a predetermined group according to the predetermined group to which the UE belongs, where different predetermined groups correspond to different physical resources.

For situations where there are a large number of idle state and/or inactive state UE, the base station can divide the UE into N groups, where N is a positive integer greater than or equal to 2. A group can include one or more UE. The base station can configure different physical resources of reference information for each group of UE. A group of UE can be allocated two physical resources of reference information, which are used to indicate different states of PEI respectively. The base station configures 2N physical resources of reference information for N groups of UE, and each group of UE is configured with two physical resources of reference information.

For example, the base station can divide UE into two groups, and the physical resources of the reference signals configured for the first and second groups of UE by the base station are different. UE can receive reference signal from corresponding physical resource based on its group, and determine the state of PEI based on the reference signal received through different physical resource.

For example, the physical resources of the reference signal configured by the base station for the first group of UE are a first physical resource and a second physical resource. The reference signal transmitted through the first physical resource can indicate that the PEI is in the first state. The reference signal transmitted through the second physical resource can indicate that the PEI is in the second state. The first group of UE receives a reference signals at the first and/or second physical resources, and determines the states of the PEI based on the reference signals received by the first and/or second physical resources.

The physical resources of the reference signal configured by the base station for the second group of UE are a third physical resource and a fourth physical resource. The reference signal transmitted by the third physical resource can indicate that the PEI is in the first state. The reference signal transmitted by the fourth physical resource can indicate that the PEI is in the second state. The second group of UE receives a reference signals at the third and/or fourth physical resources, and determines the states of the PEI based on the reference signals received by the third and/or fourth physical resources. In this way, PEI can be indicated for different groups of UE through reference signals from different resources, thereby reducing the occurrence of false wake-up when all UE use the same PEI.

In one embodiment, the method further includes:

In response to the base station configuring first PEI configuration information and second PEI configuration information, where the first PEI configuration information indicates that the reference signal is used to indicate the PEI, and the second PEI configuration information indicates that predetermined information is used to indicate the PEI, where the predetermined information is different from the reference signal, determining the PEI based on the first configuration information or the second PEI configuration information according to the corresponding priority of the first PEI configuration information and the second PEI configuration information.

The base station configures different signals to indicate PEI, such as using a reference signal to indicate PEI, or using another signal different from the reference signal to indicate PEI. For the case of using different signals to indicate PEI, the base station can configure different PEI configuration information for different signals: configure first PEI configuration information for the case of using reference signal to indicate PE, and configure second PEI configuration information for the case of using another signal different from the reference signal to indicate PEI. Here, the first PEI configuration information and the second PEI configuration information are only for example, and the base station can configure more than two pieces of PEI configuration information.

The base station can set priorities for both the first PEI configuration information and the second PEI configuration information. When the base station is configured with both the first configuration information and second PEI configuration information, UE can determine the PEI based on the first configuration information and second PEI configuration information according to the priorities. That is to say, the UE can determine whether to determine the PEI based on the reference signal or based on predetermined information different from the reference signal according to the priorities. For example, if the priority of the first PEI configuration information is higher than that of the second PEI configuration information, the PEI is determined based on the reference signal; if the priority of the second PEI configuration information is higher than that of the first PEI configuration information, the PEI is determined based on the predetermined information. Here, the predetermined information can be other signal different from the reference signal, or it can be downlink signaling, etc.

In one embodiment, the second PEI configuration information indicates using a DCI message to indicate the PEI.

Here, the base station can use reference signals such as TRS and/or CSI-RS to indicate PEI. DCI message can also be used to indicate PEI. Two different codes of one or more bits in DCI can be used to indicate the two states of PEI.

The following provides a specific example in conjunction with any of the above embodiments:

1. The base station sends signal configuration information for TRS/CSI-RS that can be used for the synchronization of the idle state UE and/or the inactive state UE, and indicates that TRS/CSI-RS can also be used as PEI configuration information for the idle state UE and/or the inactive state UE.

2. When the base station indicates that TRS/CSI-RS is available, it implicitly confirms that UE should use TRS/CSI-RS as the PEI.

3. When the base station indicates that TRS/CSI-RS is unavailable, it implicitly confirms that the UE should not use TRS/CSI-RS as the PEI, and PEI of other configuration of the base station can be used.

4. When the UE detects the configured TRS/CSI-RS for synchronization and determines that the PEI indicates true, the UE will continue to receive paging DCI and paging information at the PO. Otherwise, skip the above PO.

5. The above method for determining whether the PEI indicates true or false can include: true and false using different physical resources.

6. Furthermore, the base station can configure 2n physical resources, representing n groups of users.

7. The grouped UE determines whether the first group has paging based on whether the first group is true or false; the same applies to the second group.

8. The base station is configured with a hybrid PEI method, namely DCI based PEI and TRS based PEI. The base station can configure the active logic for DCI based PEI and TRS based PEI, that is, when TRS based PEI is active, DCI based PEI is no longer active.

Figure 4:
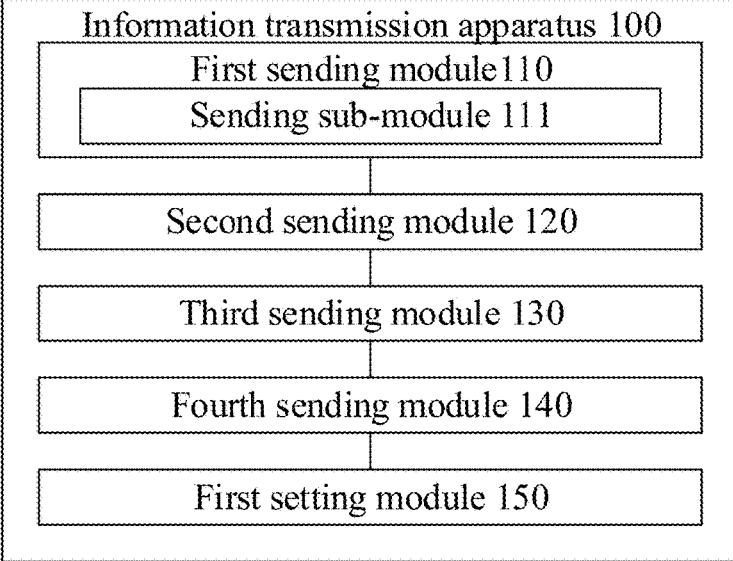
FIG. 4 is a block diagram illustrating an information transmission apparatus according to an exemplary embodiment of the present disclosure.

The embodiment of the present disclosure also provides an information transmission apparatus applied to a base station for wireless communication, as shown in FIG. 4. The information transmission apparatus 100 includes: a first sending module 110, where, The first sending module 110 is configured to send first paging early indication (PEI) configuration information, where the first PEI configuration information indicates whether the reference signal is used to indicate PEI.

In one embodiment, the first sending module 110 includes:

A sending sub-module 111 configured to send signal configuration information carrying the first PEI configuration information, where the signal configuration information at least indicates the transmission resource of the reference signal.

In one embodiment, the first PEI configuration information indicates at least one of the following:

When the signal configuration information is active, the reference signal associated with the signal configuration information is used to indicate the PEI;

When the signal configuration information is inactive, the reference signal associated with the signal configuration information is not used to indicate the PEI.

In one embodiment, in response to that the reference signal associated with the signal configuration information indicates the PEI, the apparatus 100 further includes at least one of the following:

A second sending module 120 configured to send the reference signal through a first physical resource, where the reference signal sent through the first physical resource indicates the first state of the PEI, where the first state of the PEI indicates the UE to receive paging related information at a predetermined paging occasion PO;

A third sending module 130 configured to send the reference signal through a second physical resource, where the reference signal sent through the second physical resource indicates the second state of the PEI, where the second state of the PEI indicates the UE not to receive paging related information at the predetermined PO, where the first physical resource is different from the second physical resource.

In one embodiment, the apparatus 100 further includes:

A fourth sending module 140 configured to send the reference signals through different physical resources for UE belonging to different predetermined groups.

In one embodiment, the apparatus 100 further includes:

A first setting module 150 configured to configure priorities respectively corresponding to the first PEI configuration information and the second PEI configuration information in response to the base station configured with the first PEI configuration information and the second PEI configuration information, where the first PEI configuration information indicates using the reference signal to indicate the PEI, and the second PEI configuration information indicates using predetermined information to indicate the PEI, where the predetermined information is different from the reference signal, where the priorities corresponding to the first PEI configuration information and the second PEI configuration information are used by UE to determine the PEI based on the first PEI configuration information or the second PEI configuration information.

In one embodiment, the second PEI configuration information indicates using a DCI message to indicate the PEI.

In one embodiment, the reference signal includes:

Tracking reference signal (TRS) and/or channel state information reference signal (CSI-RS).

Figure 5:
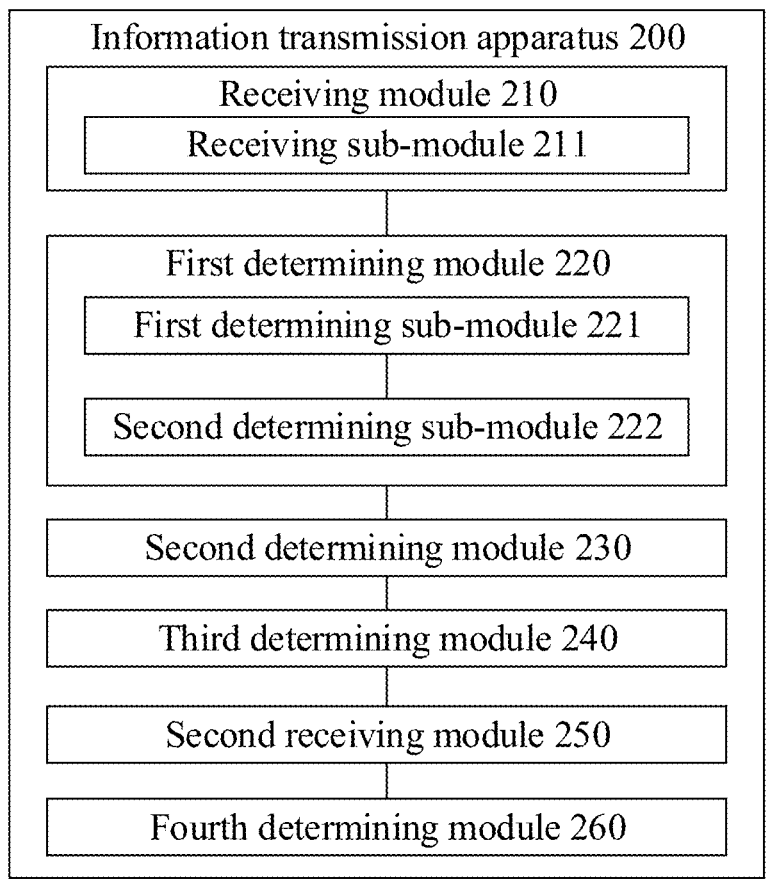
FIG. 5 is a block diagram illustrating another information transmission apparatus according to an exemplary embodiment of the present disclosure.

The embodiment of the present disclosure also provides an information transmission apparatus applied to idle state UE and/or inactive state UE in wireless communication, as shown in FIG. 5. The information transmission apparatus 200 includes a first receiving module 210 and a first determining module 220, where, The first receiving module 210 is configured to receive first paging early indication (PEI) configuration information;

The first determining module 220 is configured to determine whether the reference signal is used to indicate the PEI based on the first PEI configuration information.

In one embodiment, the first receiving module 210 includes:

A receiving sub-module 211 configured to receive signal configuration information carrying the first PEI configuration information, where the signal configuration information at least indicates the transmission resource of the reference signal.

In one embodiment, the first determining module 220 includes at least one of the following: a first determining sub-module 221 and a second determining sub-module 222.

The first determining sub-module 221 is configured to determine that the reference signal associated with the signal configuration information is used to indicate the PEI when the signal configuration information is active based on the first PEI configuration information;

The second determining sub-module 222 is configured to determine that the reference signal associated with the signal configuration information is not used to indicate the PEI when the signal configuration information is inactive based on the first PEI configuration information.

In one embodiment, in response to determining that the reference signal associated with the signal configuration information is used to indicate the PEI, the apparatus 200 further includes at least one of the following: a second determining module 230 and a third determining module 240.

The second determining module 230 is configured to determine that the PEI is in a first state in response to receiving the reference signal through a first physical resource, where the first state of the PEI is used to indicate the UE to receive paging related information at a predetermined paging occasion PO.

The third determining module 240 is configured to determine that the PEI is in a second state in response to sending the reference signal through a second physical resource, where the second state of the PEI is used to indicate the UE not to receive paging related information at the predetermined paging occasion PO, where the first physical resource is different from the second physical resource.

In one embodiment, the apparatus 200 further includes: a second receiving module 250.

The second receiving module 250 is configured to receive the reference signal through the physical resource corresponding to a predetermined group according to the predetermined group to which the UE belongs, where physical resources corresponding to different predetermined groups are different.

In one embodiment, the apparatus 200 further includes: a fourth determining module 260.

The fourth determining module 260 is configured to determine the PEI based on the first PEI configuration information or the second PEI configuration information according to the priorities respectively corresponding to the first PEI configuration information and the second PEI configuration information, in response to the base station configuring the first PEI configuration information and the second PEI configuration information, where the first PEI configuration information indicates using the reference signal to indicate the PEI, and the second PEI configuration information indicates using predetermined information to indicate the PEI, where the predetermined information is different from the reference signal.

In one embodiment, the second PEI configuration information indicates using a DCI message to indicate the PEI.

In one embodiment, the reference signal includes:

Tracking reference signal (TRS) and/or channel state information reference signal (CSI-RS).

In exemplary embodiments, the apparatus 200 can be implemented by one or more central processing units (CPUs), graphics processing unit (GPU), baseband processor (BP), application specific integrated circuit (ASIC), DSP, programmable logic device (PLD), complex programmable logic device (CPLD), field programmable gate array (FPGA), general-purpose processor, controller, micro controller unit (MCU), microprocessor (Microprocessor), or other electronic component for executing the aforementioned method.

Figure 6:
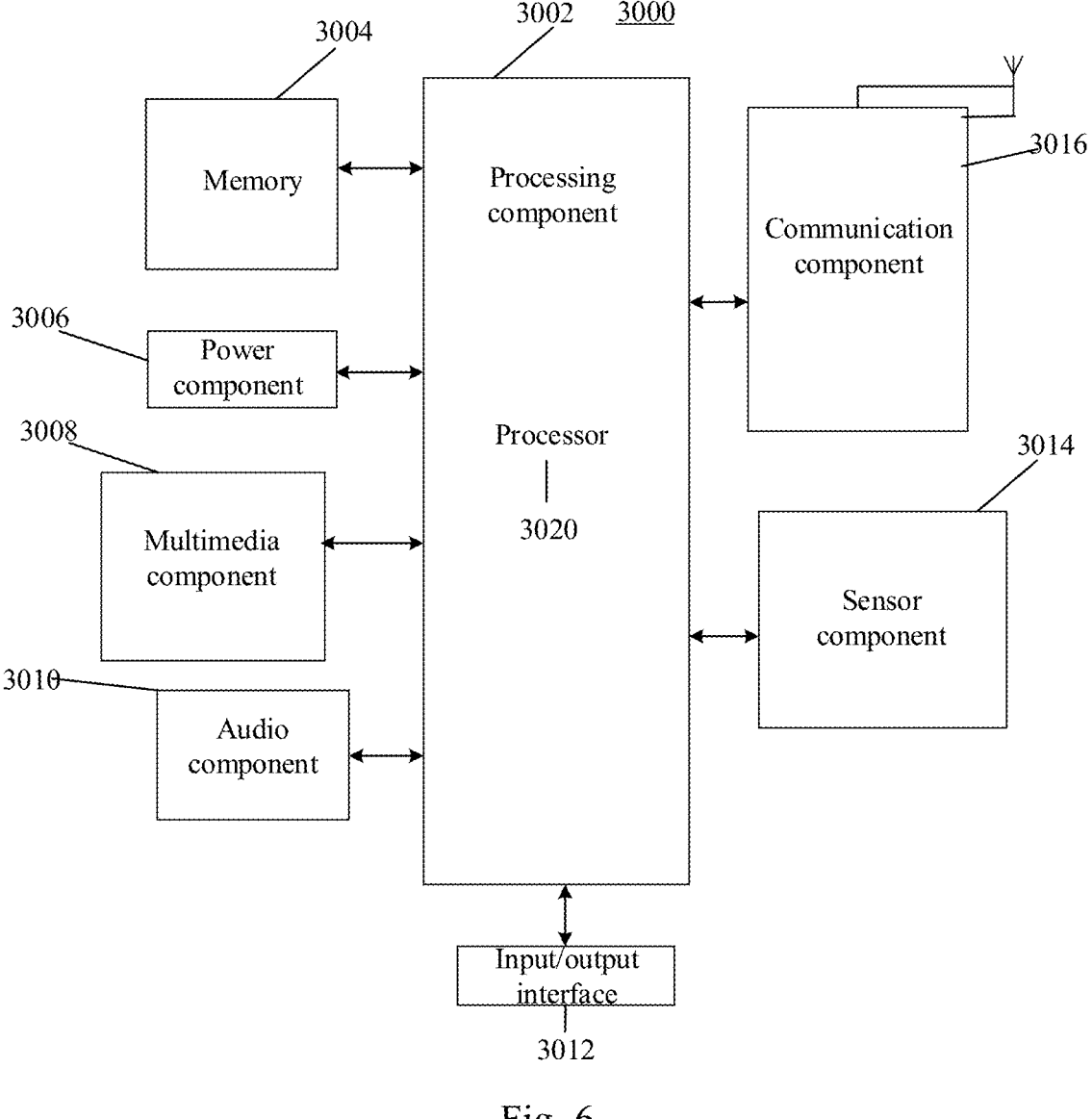
FIG. 6 is a block diagram illustrating an apparatus for information transmission according to an exemplary embodiment of the present disclosure.

FIG. 6 is a block diagram of a device 3000 for information transmission, illustrated according to an exemplary embodiment. For example, the device 3000 can be a mobile phone, computer, digital broadcasting terminal, messaging device, game console, tablet device, medical device, fitness device, personal digital assistant, etc.

Referring to FIG. 6, device 3000 may include one or more of the following components: processing component 3002, memory 3004, power component 3006, multimedia component 3008, audio component 3010, input/output (I/O) interface 3012, sensor component 3014, and communication component 3016.

Processing component 3002 typically controls the overall operation of device 3000, such as operations associated with display, telephone call, data communication, camera operation, and recording operation. The processing component 3002 may include one or more processors 3020 to execute instructions to complete all or part of the steps of the above method. In addition, the processing component 3002 may include one or more modules to facilitate the interaction between the processing component 3002 and other components. For example, the processing component 3002 may include multimedia module to facilitate interaction between the multimedia component 3008 and the processing component 3002.

Memory 3004 is configured to store various types of data to support operations on device 3000. Examples of these data include instructions for any application or method used to operate on device 3000, contact data, phone book data, messages, images, videos, etc. Memory 3004 can be implemented by any type of volatile or non-volatile storage device or a combination of them, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disc.

The power component 3006 provides power to various components of the device 3000. Power component 3006 can include a power management system, one or more power supplies, and other components associated with generating, managing, and distributing power for device 3000.

The multimedia component 3008 includes a screen that provides an output interface between the device 3000 and the user. In some embodiments, the screen may include a liquid crystal display (LCD) and a touch panel (TP). If the screen includes a touch panel, the screen can be implemented as a touch screen to receive input signals from the user. The touch panel includes one or more touch sensors to sense touch, sliding, and gestures on the touch panel. Touch sensors can not only sense the boundaries of touch or sliding actions, but also detect the duration and pressure associated with touch or sliding operations. In some embodiments, the multimedia component 3008 includes a front camera and/or a rear camera. When the device 3000 is in operating mode, such as shooting mode or video mode, the front camera and/or rear camera can receive external multimedia data. Each of the front camera and the rear camera can be a fixed optical lens system or has focal length and optical zoom capability.

The audio component 3010 is configured to output and/or input audio signals. For example, audio component 3010 includes a microphone (MIC) configured to receive external audio signals when device 3000 is in operating modes such as call mode, recording mode, and speech recognition mode. The received audio signal can be further stored in memory 3004 or sent by the communication component 3016. In some embodiments, the audio component 3010 also includes a speaker for outputting audio signals.

I/O interface 3012 provides an interface between the processing component 3002 and the peripheral interface modules, which can be keyboards, click wheels, buttons, etc. These buttons can include but are not limited to: home button, volume button, start button, and lock button.

Sensor component 3014 includes one or more sensors for providing state evaluation of various aspects for device 3000. For example, sensor component 3014 can detect the on/off state of device 3000 and the relative positioning of the components. For example, the components can be display and keypad of the device 3000. Sensor component 3014 can also detect changes in the position of the device 3000 or one component of the device 3000, the presence or absence of user contact with the device 3000, the orientation or acceleration/deceleration of the device 3000, and temperature changes of the device 3000. Sensor component 3014 can include a proximity sensor configured to detect the presence of nearby objects without any physical contact. The sensor component 3014 can also include optical sensor, such as CMOS or CCD image sensor, for use in imaging application. In some embodiments, the sensor component 3014 may also include an acceleration sensor, gyroscope sensor, magnetic sensor, pressure sensor, or temperature sensor.

The communication component 3016 is configured to facilitate wired or wireless communication between the device 3000 and other devices. The device 3000 can be connected to wireless network based on communication standard, such as Wi-Fi, 2G, or 3G, or a combination of them. In an exemplary embodiment, the communication component 3016 receives broadcast signal or broadcast related information from an external broadcast management system through a broadcast channel. In an exemplary embodiment, communication component 3016 further includes a Near Field Communication (NFC) module to facilitate short range communication. For example, the NFC module can be implemented based on radio frequency identification (RFID) technology, infrared data association (IrDA) technology, ultra wideband (UWB) technology, Bluetooth (BT) technology, and other technologies.

In exemplary embodiments, the device 3000 can be implemented by one or more of application specific integrated circuits (ASICs), digital signal processors (DSPDs), digital signal processing devices (DSPDs), programmable logic devices (PLDs), field programmable gate arrays (FPGAs), controllers, microcontrollers, microprocessors, or other electronic components to perform the above methods.

In exemplary embodiments, a non-transitory computer readable storage medium including instructions is also provided, such as memory 3004 including instructions, which can be executed by the processor 3020 of the device 3000 to complete the above method. For example, the non-transitory computer readable storage media can be ROM, random access memory (RAM), CD-ROM, magnetic tape, floppy disk, and optical data storage devices.

According to a first aspect of the embodiments of the present disclosure, an information transmission method is provided. The method is applied to a base station, and includes: sending first paging early indication (PEI) configuration information, wherein the first PEI configuration information indicates whether a reference signal is used to indicate PEI.

In one embodiment, sending the first PEI configuration information includes: sending signal configuration information carrying the first PEI configuration information, where the signal configuration information at least indicates a transmission resource of the reference signal.

In one embodiment, the first PEI configuration information indicates at least one of the following: when the signal configuration information is active, the reference signal associated with the signal configuration information is used to indicate the PEI; when the signal configuration information is inactive, the reference signal associated with the signal configuration information is not used to indicate the PEI.

In one embodiment, in response to that the reference signal associated with the signal configuration information is used to indicate the PEI, the method further includes at least one of the following: sending the reference signal through a first physical resource, wherein the reference signal sent through the first physical resource indicates a first state of the PEI, wherein the first state of the PEI indicates a UE to receive paging related information at a predetermined paging occasion (PO); sending the reference signal through a second physical resource, wherein the reference signal sent through the second physical resource indicates a second state of the PEI, wherein the second state of the PEI indicates the UE not to receive the paging related information at the predetermined PO, wherein the first physical resource is different from the second physical resource.

In one embodiment, the method further includes: sending the reference signal through different physical resources for UEs belonging to different predetermined groups.

In one embodiment, the method further includes: in response to the base station configuring the first PEI configuration information and second PEI configuration information, wherein the first PEI configuration information indicates using the reference signal to indicate the PEI, and the second PEI configuration information indicates using predetermined information to indicate the PEI, wherein the predetermined information is different from the reference signal, configuring priorities respectively corresponding to the first PEI configuration information and the second PEI configuration information, wherein the priorities corresponding to the first PEI configuration information and the second PEI configuration information are used by UE to determine the PEI based on the first PEI configuration information or the second PEI configuration information.

In one embodiment, the second PEI configuration information indicates using a DCI message to indicate the PEI.

In one embodiment, the reference signal includes: tracking reference signal TRS and/or channel state information reference signal CSI-RS.

According to a second aspect of the embodiments of the present disclosure, an information transmission method is provided. The method is applied to user equipment UE and includes: receiving first paging early indication PEI configuration information; determining whether a reference signal is used to indicate PEI based on the first PEI configuration information.

In one embodiment, receiving the first PEI configuration information includes: receiving signal configuration information carrying the first PEI configuration information, wherein the signal configuration information at least indicates a transmission resource of the reference signal.

In one embodiment, determining whether the reference signal is used to indicate the PEI based on the first PEI configuration information includes at least one of the following: determining the reference signal associated with the signal configuration information is used to indicate the PEI when the signal configuration information is active, based on the first PEI configuration information; determining the reference signal associated with the signal configuration information is not used to indicate the PEI when the signal configuration information is inactive, based on the first PEI configuration information.

In one embodiment, in response to determining that the reference signal associated with the signal configuration information is used to indicate the PEI, the method further includes at least one of the following: determining that the PEI is in a first state in response to receiving the reference signal through a first physical resource, wherein the first state of the PEI indicates the UE to receive paging related information at a predetermined paging occasion PO; determining that the PEI is in a second state in response to sending the reference signal through a second physical resource, wherein the second state of the PEI indicates the UE not to receive the paging related information at the predetermined paging occasion PO, wherein the first physical resource is different from the second physical resource.

In one embodiment, the method further includes: receiving the reference signal through a physical resource corresponding to a predetermined group according to the predetermined group to which the UE belongs, wherein physical resources corresponding to different predetermined groups are different.

In one embodiment, the method further includes: in response to a base station configuring the first PEI configuration information and second PEI configuration information, wherein the first PEI configuration information indicates using the reference signal to indicate the PEI, and the second PEI configuration information indicates using predetermined information to indicate the PEI, wherein the predetermined information is different from the reference signal, determining the PEI based on the first PEI configuration information or the second PEI configuration information according to priorities respectively corresponding to the first PEI configuration information and the second PEI configuration information.

In one embodiment, the second PEI configuration information indicates using a DCI message to indicate the PEI.

In one embodiment, the reference signal includes: tracking reference signal TRS and/or channel state information reference signal CSI-RS.

According to a third aspect of the embodiments of the present disclosure, an information transmission apparatus is provided. The information transmission apparatus is applied to a base station, and includes: a first sending module, where the first sending module is configured to send first paging early indication PEI configuration information, wherein the first PEI configuration information indicates whether a reference signal is used to indicate PEI.

In one embodiment, the first sending module includes: a sending sub-module configured to send signal configuration information carrying the first PEI configuration information, wherein the signal configuration information at least indicates a transmission resource of the reference signal.

In one embodiment, the first PEI configuration information indicates at least one of the following: when the signal configuration information is active, the reference signal associated with the signal configuration information is used to indicate the PEI; when the signal configuration information is inactive, the reference signal associated with the signal configuration information is not used to indicate the PEI.

In one embodiment, in response to that the reference signal associated with the signal configuration information is used to indicate the PEI, the apparatus further includes at least one of the following: a second sending module configured to send the reference signal through a first physical resource, wherein the reference signal sent through the first physical resource indicates a first state of the PEI, wherein the first state of the PEI indicates a UE to receive paging related information at a predetermined paging occasion PO; a third sending module configured to send the reference signal through a second physical resource, wherein the reference signal sent through the second physical resource indicates a second state of the PEI, wherein the second state of the PEI indicates the UE not to receive the paging related information at the predetermined PO, wherein the first physical resource is different from the second physical resource.

In one embodiment, the apparatus further includes: a fourth sending module configured to send the reference signal through different physical resources for UEs belonging to different predetermined groups.

In one embodiment, the apparatus further includes: a first setting module configured to configure priorities respectively corresponding to the first PEI configuration information and second PEI configuration information in response to the base station configuring the first PEI configuration information and the second PEI configuration information, wherein the first PEI configuration information indicates using the reference signal to indicate the PEI, and the second PEI configuration information indicates using predetermined information to indicate the PEI, wherein the predetermined information is different from the reference signal, wherein the priorities corresponding to the first PEI configuration information and the second PEI configuration information are used by UE to determine the PEI based on the first PEI configuration information or the second PEI configuration information.

In one embodiment, the second PEI configuration information indicates using a DCI message to indicate the PEI.

In one embodiment, the reference signal includes: tracking reference signal TRS and/or channel state information reference signal CSI-RS.

According to a fourth aspect of the embodiments of the present disclosure, an information transmission apparatus is provided. The information transmission apparatus is applied to user equipment UE, and includes a first receiving module and a first determining module, where, the first receiving module is configured to receive first paging early information PEI configuration information; the first determining module is configured to determine whether a reference signal is used to indicate the PEI based on the first PEI configuration information.

In one embodiment, the first receiving module includes: a receiving sub-module configured to receive signal configuration information carrying the first PEI configuration information, wherein the signal configuration information at least indicates a transmission resource of the reference signal.

In one embodiment, the first determining module includes at least one of the following: a first determining sub-module configured to determine the reference signal associated with the signal configuration information is used to indicate the PEI when the signal configuration information is active, based on the first PEI configuration information; a second determining sub-module configured to determine the reference signal associated with the signal configuration information is not used to indicate the PEI when the signal configuration information is inactive, based on the first PEI configuration information.

In one embodiment, in response to determining that the reference signal associated with the signal configuration information is used to indicate the PEI, the apparatus further includes at least one of the following: a second determining module configured to determine that the PEI is in a first state in response to receiving the reference signal through a first physical resource, wherein the first state of the PEI indicates the UE to receive paging related information at a predetermined paging occasion PO; a third determining module configured to determine that the PEI is in a second state in response to sending the reference signal through a second physical resource, wherein the second state of the PEI indicates the UE not to receive the paging related information at the predetermined paging occasion PO, wherein the first physical resource is different from the second physical resource.

In one embodiment, the apparatus further includes: a second receiving module configured to receive the reference signal through a physical resource corresponding to a predetermined group according to the predetermined group to which the UE belongs, wherein physical resources corresponding to different predetermined groups are different.

In one embodiment, the apparatus further includes: a fourth determining module configured to determining the PEI based on the first PEI configuration information or second PEI configuration information according to priorities respectively corresponding to the first PEI configuration information and the second PEI configuration information, in response to the base station configuring the first PEI configuration information and the second PEI configuration information, wherein the first PEI configuration information indicates using the reference signal to indicate the PEI, and the second PEI configuration information indicates using predetermined information to indicate the PEI, wherein the predetermined information is different from the reference signal.

In one embodiment, the second PEI configuration information indicates using a DCI message to indicate the PEI.

In one embodiment, the reference signal includes: tracking reference signal TRS and/or channel state information reference signal CSI-RS.

According to a fifth aspect of the embodiments of the present disclosure, a communication device is provided, including a processor, a memory, and an executable program stored on the memory and capable of being run by the processor. The processor executes steps of the information transmission method according to the first aspect or the second aspect when running the executable program.

According to a sixth aspect of the embodiments of the present disclosure, a storage medium is provided, where the executable program is executed by a processor to implement steps of the information transmission method according to the first aspect or the second aspect.

After considering the specifications and practicing the present disclosure, those skilled in the art will easily come up with other embodiments of the present disclosure. The present disclosure aims to cover any variations, uses, or adaptive changes of the embodiments of the present disclosure, which follow the general principles of the embodiments of the present disclosure and include common knowledge or commonly used technical means in the technical field that are not disclosed in the disclosed embodiments. The specification and embodiments are only considered exemplary, and the true scope and spirit of the embodiments of the present disclosure are indicated by the following claims.

It should be understood that the embodiments of the present disclosure are not limited to the precise structure described above and shown in the accompanying drawings, and various modifications and changes can be made without departing from their scope. The scope of the embodiments of the present disclosure is limited only by the attached claims.

What is claimed is:

1. An information transmission method, comprising:

sending, by a base station, first paging early indication (PEI) configuration information, wherein the first PEI configuration information indicates whether a reference signal is used to indicate a PEI, wherein sending the first PEI configuration information comprises:

sending signal configuration information carrying the first PEI configuration information, wherein the signal configuration information at least indicates a transmission resource of the reference signal, wherein the method further comprises at least one of:

in response to a determination that the reference signal associated with the signal configuration information is used to indicate the PEI, sending, by the base station, the reference signal through a first physical resource, wherein the reference signal sent through the first physical resource indicates a first state of the PEI, and the first state of the PEI indicates a user equipment (UE) to receive paging related information at a predetermined paging occasion (PO); or, in response to a determination that the reference signal associated with the signal configuration information is used to indicate the PEI, sending, by the base station, the reference signal through a second physical resource, wherein the reference signal sent through the second physical resource indicates a second state of the PEI, the second state of the PEI indicates the UE refrains from receiving the paging related information at the predetermined PO, and the first physical resource is different from the second physical resource.

2. The method according to claim 1, wherein the reference signal comprises at least one of:

a tracking reference signal (TRS) or a channel state information reference signal (CSI-RS).

3. The method according to claim 1, wherein the first PEI configuration information indicates at least one of:

in response to activation of the signal configuration information, the reference signal associated with the signal configuration information is used to indicate the PEI; or in response to deactivation of the signal configuration information, the reference signal associated with the signal configuration information is not used to indicate the PEI.

4. The method according to claim 1, further comprising:

sending, by the base station, the reference signal through different physical resources for UEs belonging to different predetermined groups.

5. The method according to claim 1, further comprising:

in response to the base station configuring the first PEI configuration information and second PEI configuration information, configuring, by the base station, priorities respectively corresponding to the first PEI configuration information and the second PEI configuration information, wherein the first PEI configuration information indicates using the reference signal to indicate the PEI, the second PEI configuration information indicates using predetermined information to indicate the PEI, the predetermined information is different from the reference signal, wherein the priorities corresponding to the first PEI configuration information and the second PEI configuration information are used by a user equipment (UE) to determine the PEI based on the first PEI configuration information or the second PEI configuration information.

6. The method according to claim 5, wherein the second PEI configuration information indicates using a Downlink Control Information (DCI) message to indicate the PEI.

7. An information transmission method, comprising:

receiving, by a user equipment (UE), first paging early indication (PEI) configuration information; and determining, by the UE, whether a reference signal is used to indicate a PEI based on the first PEI configuration information, wherein receiving the first PEI configuration information comprises:

receiving signal configuration information carrying the first PEI configuration information, wherein the signal configuration information at least indicates a transmission resource of the reference signal, wherein the method further comprising at least one of:

in response to determining that the reference signal associated with the signal configuration information is used to indicate the PEI and receiving the reference signal through a first physical resource, determining, by the UE, that the PEI is in a first state, wherein the first state of the PEI indicates the UE to receive paging related information at a predetermined paging occasion (PO); or in response to determining that the reference signal associated with the signal configuration information is used to indicate the PEI and receiving the reference signal through a second physical resource, determining, by the UE, that the PEI is in a second state, wherein the second state of the PEI indicates the UE refrains from receiving the paging related information at the predetermined paging occasion PO, and the first physical resource is different from the second physical resource.

8. The method according to claim 7, wherein the reference signal comprises at least one of:

a tracking reference signal (TRS) or a channel state information reference signal (CSI-RS).

9. The method according to claim 7, further comprising:

in response to a base station configuring the first PEI configuration information and second PEI configuration information, determining, by the UE, the PEI based on the first PEI configuration information or the second PEI configuration information according to priorities respectively corresponding to the first PEI configuration information and the second PEI configuration information, wherein the first PEI configuration information indicates using the reference signal to indicate the PEI, the second PEI configuration information indicates using predetermined information to indicate the PEI, and the predetermined information is different from the reference signal.

10. The method according to claim 9, wherein the priorities corresponding to the first PEI configuration information and the second PEI configuration information are used by a user equipment (UE) to determine the PEI based on the first PEI configuration information or the second PEI configuration information.

11. The method according to claim 9, wherein the second PEI configuration information indicates using a Downlink Control Information (DCI) message to indicate the PEI.

12. The method according to claim 7, wherein determining whether the reference signal is used to indicate the PEI based on the first PEI configuration information comprises at least one of:

determining that the reference signal associated with the signal configuration information is used to indicate the PEI in response to activation of the signal configuration information based on the first PEI configuration information; or determining that the reference signal associated with the signal configuration information is disabled for indicating the PEI in response to deactivation of the signal configuration information, based on the first PEI configuration information.

13. The method according to claim 7, further comprising:

receiving, by the UE, the reference signal through a physical resource corresponding to a predetermined group to which the UE belongs, wherein different physical resources used for receiving the reference signal correspond to different predetermined groups.

14. An information transmission apparatus, applied to user equipment (UE), comprising:

a processor; and a memory configured to store an executable program, wherein the executable program, when executed by the processor, enables the processor to perform steps of:

receiving first paging early indication (PEI) configuration information;

determining whether a reference signal is used to indicate a PEI based on the first PEI configuration information, wherein receiving the first PEI configuration information comprises:

receiving signal configuration information carrying the first PEI configuration information, wherein the signal configuration information at least indicates a transmission resource of the reference signal, wherein the executable program, when executed by the processor, enables the processor to further perform at least one of:

in response to determining that the reference signal associated with the signal configuration information is used to indicate the PEI and receiving the reference signal through a first physical resource, determining that the PEI is in a first state, wherein the first state of the PEI indicates the UE to receive paging related information at a predetermined paging occasion (PO); or in response to determining that the reference signal associated with the signal configuration information is used to indicate the PEI and receiving the reference signal through a second physical resource, determining that the PEI is in a second state, wherein the second state of the PEI indicates the UE refrains from receiving the paging related information at the predetermined paging occasion PO, and the first physical resource is different from the second physical resource.

15. The apparatus according to claim 14, wherein determining whether the reference signal is used to indicate the PEI based on the first PEI configuration information, comprises at least one of:

determining that the reference signal associated with the signal configuration information is used to indicate the PEI in response to activation of the signal configuration information, based on the first PEI configuration information; or determining that the reference signal associated with the signal configuration information is disabled for indicating the PEI in response to deactivation of the signal configuration information, based on the first PEI configuration information.

16. The apparatus according to claim 14, wherein the executable program, when executed by the processor, enables the processor to further perform:

receiving the reference signal through a physical resource corresponding to a predetermined group to which the UE belongs, wherein different physical resources used for receiving the reference signal correspond to different predetermined groups.

17. The apparatus according to claim 14, wherein the executable program, when executed by the processor, enables the processor to further perform:

in response to a base station configuring the first PEI configuration information and second PEI configuration information, determining the PEI based on the first PEI configuration information or the second PEI configuration information according to priorities respectively corresponding to the first PEI configuration information and the second PEI configuration information wherein the first PEI configuration information indicates using the reference signal to indicate the PEI, the second PEI configuration information indicates using predetermined information to indicate the PEI, and the predetermined information is different from the reference signal.

18. The apparatus according to claim 17, wherein the priorities corresponding to the first PEI configuration information and the second PEI configuration information are used by a user equipment (UE) to determine the PEI based on the first PEI configuration information or the second PEI configuration information.

19. The apparatus according to claim 17, wherein the second PEI configuration information indicates using a Downlink Control Information (DCI) message to indicate the PEI.

20. The apparatus according to claim 14, wherein the reference signal comprises at least one of:

a tracking reference signal (TRS) or a channel state information reference signal (CSI-RS).

* * * * *